(12) United States Patent
Li et al.

(10) Patent No.: US 12,045,260 B2
(45) Date of Patent: Jul. 23, 2024

(54) DATA REORGANIZATION

(71) Applicant: International Business Machines Corporation, Armonk, NY (US)

(72) Inventors: Qing Li, Beijing (CN); Shan Gu, Beijing (CN); Shuang Men, Beijing (CN); Cheng Fang Wang, Beijing (CN); Li Hua Zhao, Beijing (CN); Qian Xia Song, Beijing (CN); Zhan Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 17/360,363

(22) Filed: Jun. 28, 2021

(65) Prior Publication Data
US 2022/0414122 A1 Dec. 29, 2022

(51) Int. Cl.
G06F 16/00 (2019.01)
G06F 16/28 (2019.01)
G06N 20/00 (2019.01)

(52) U.S. Cl.
CPC ........... G06F 16/285 (2019.01); G06N 20/00 (2019.01)

(58) Field of Classification Search
CPC .................................................. G06F 16/285
See application file for complete search history.

(56) References Cited

U.S. PATENT DOCUMENTS

| | | | |
|---|---|---|---|
| 7,958,096 B2 * | 6/2011 | Perrizo | G06N 5/025 707/693 |
| 9,075,718 B2 | 7/2015 | Hinterbichler et al. | |
| 9,727,407 B2 | 8/2017 | Ruan et al. | |
| 10,701,394 B1 * | 6/2020 | Caballero | G06N 3/045 |
| 11,112,137 B2 * | 9/2021 | Bailey | F24F 11/30 |
| 11,500,904 B2 * | 11/2022 | Brandwine | G06F 3/0604 |
| 2003/0208488 A1 * | 11/2003 | Perrizo | G06F 16/9027 |
| 2007/0250522 A1 * | 10/2007 | Perrizo | G06N 20/00 |
| 2011/0219046 A1 * | 9/2011 | Nesmyanovich | G06F 16/00 707/812 |
| 2011/0314148 A1 * | 12/2011 | Petersen | H04L 63/1408 709/224 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Farhan M Syed
(74) *Attorney, Agent, or Firm* — Daniel M. Yeates (57) ABSTRACT

A method, system, and computer program product for data reorganization and logs reorganization. The method includes receiving, by one or more processing units, original data. The method also includes classifying, by the one or more processing units, the original data into different types based on a trained type classification model. The method also includes generating, by the one or more processing units, at least one severity for at least part of the original data based on a trained severity classification model, the at least part of the original data corresponding to at least one type. The method also includes outputting, by the one or more processing units, at least one message, the at least one message indicating the severity of the at least part of the original data.

20 Claims, 7 Drawing Sheets

(56) References Cited

U.S. PATENT DOCUMENTS

| | | | |
|---|---|---|---|
| 2012/0005542 A1* | 1/2012 | Petersen | H04L 63/1425 |
| | | | 714/48 |
| 2012/0246303 A1* | 9/2012 | Petersen | G06F 16/1734 |
| | | | 709/224 |
| 2015/0254555 A1 | 9/2015 | Williams, Jr. et al. | |
| 2016/0292592 A1* | 10/2016 | Patthak | G06F 16/84 |
| 2017/0079530 A1* | 3/2017 | DiMaio | A61B 5/0261 |
| 2019/0095440 A1 | 3/2019 | Chakra et al. | |
| 2019/0179691 A1 | 6/2019 | Xu et al. | |
| 2019/0264936 A1* | 8/2019 | Bailey | F24F 11/65 |
| 2019/0370386 A1* | 12/2019 | Brandwine | G06F 18/241 |
| 2020/0012886 A1* | 1/2020 | Walters | G06V 30/1985 |
| 2020/0279105 A1* | 9/2020 | Muffat | G06N 3/08 |
| 2021/0072255 A1* | 3/2021 | Farokhzad | G06N 3/04 |
| 2021/0141995 A1* | 5/2021 | Lundgaard | G06N 3/08 |
| 2022/0036564 A1* | 2/2022 | Ye | G06T 7/0014 |
| 2022/0058449 A1* | 2/2022 | Goodsitt | G06N 5/01 |
| 2022/0156846 A1* | 5/2022 | Drennan, III | G06F 16/285 |

* cited by examiner

DATA REORGANIZATION

BACKGROUND

The present disclosure relates to data processing and, more specifically, to data reorganization and logs reorganization.

SUMMARY

The present invention provides a computer-implemented method, system, and computer program product for data reorganization and logs reorganization. The method includes receiving, by one or more processing units, original data. The method also includes classifying, by the one or more processing units, the original data into different types based on a trained type classification model. The method also includes generating, by the one or more processing units, at least one severity for at least part of the original data based on a trained severity classification model, the at least part of the original data corresponding to at least one type. The method also includes outputting, by the one or more processing units, at least one message, the at least one message indicating the severity of the at least part of the original data. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

In Big Data and Artificial Intelligence (AI), it may be hard to explore and develop insight for the data. With large amounts of original data (for instance, from social media, emails, business processes, logs of computing environments, Internet of Things (IoT) devices, etc.) it may be challenging to process and reorganize the huge amount of original data and obtain useful information about the data. Aspects of the present disclosure relate to data processing and, more specifically, to data reorganization and logs reorganization in order to help process the data and obtain useful information about the data (e.g., large amounts of data).

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
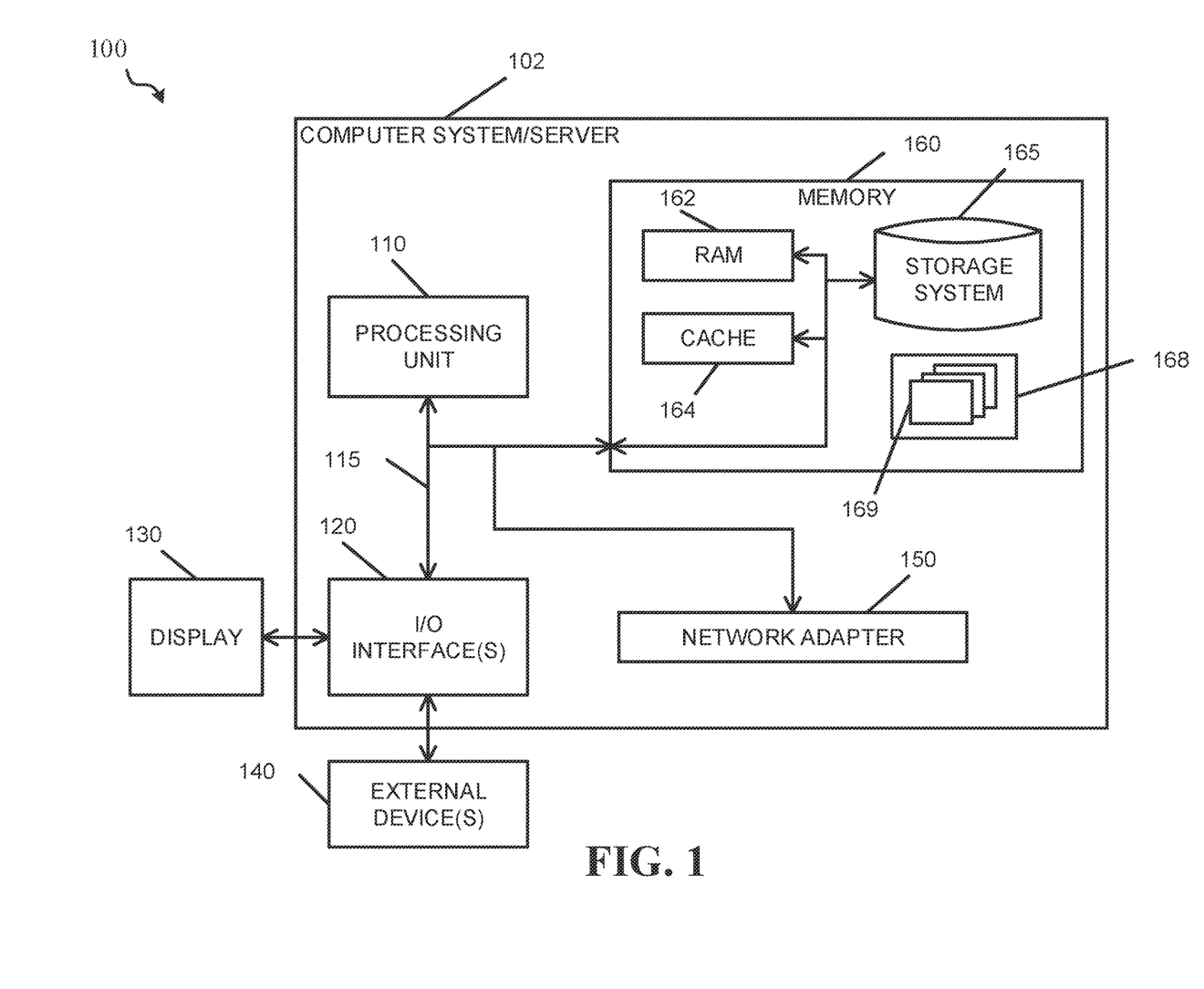
FIG. 1 depicts a cloud computing node according to some embodiments of the present disclosure.
Figure 2:
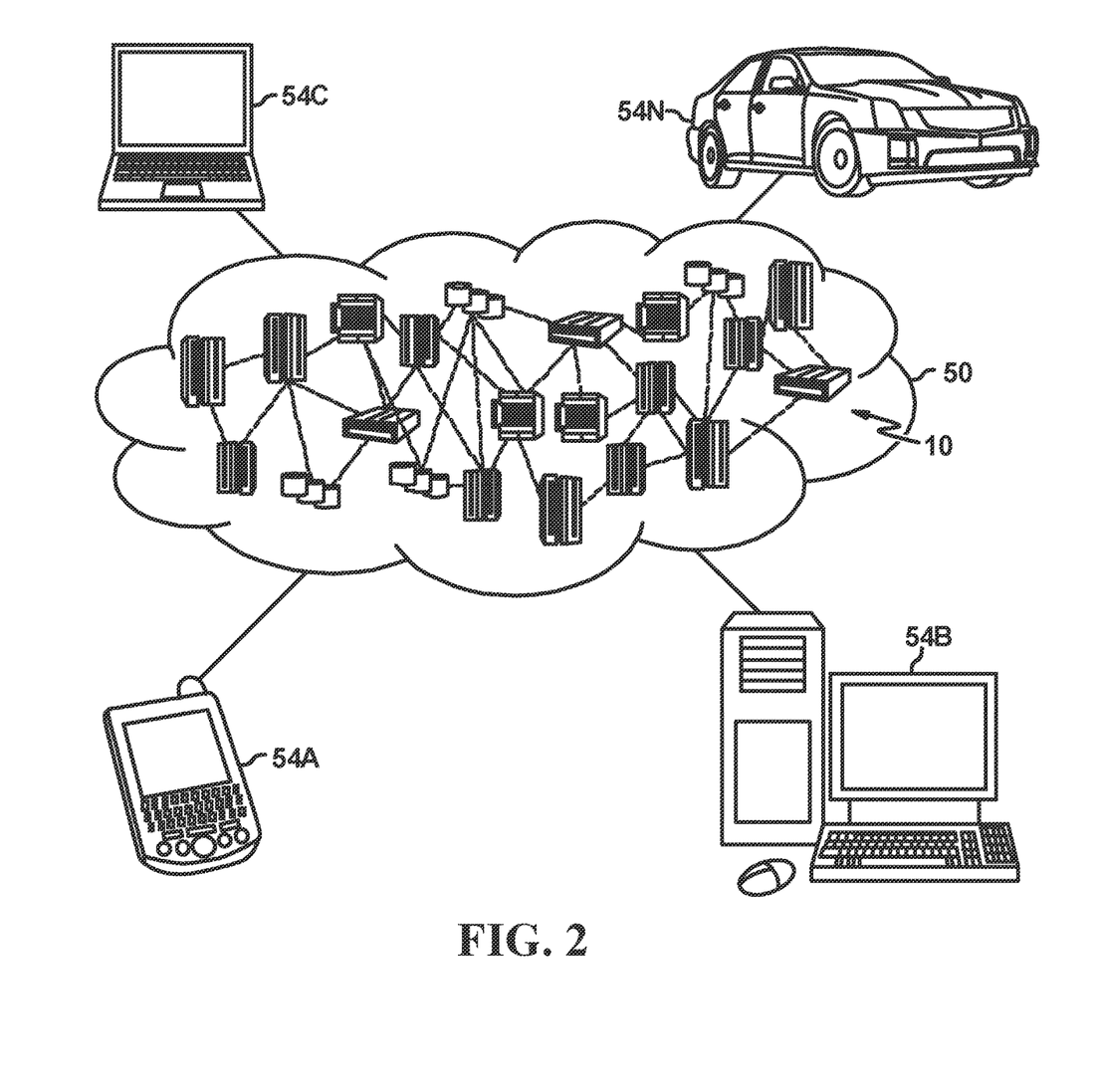
FIG. 2 depicts a cloud computing environment according to some embodiments of the present disclosure.

Referring to FIG. 1, computer system 100 is a computer system/server 102 is shown in the form of a general-purpose computing device, according to some embodiments. In some embodiments, computer system/server 102 is located in cloud computing environment 50 (FIG. 2). In some embodiments, computer system/server 102 is a cloud computing node. The components of computer system/server 102 may include, but are not limited to, one or more processors or processing units 110, a system memory 160, and a bus 115 that couples various system components including system memory 160 to processor 110.

Bus 115 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 102 typically includes a variety of computer system readable media. Such media may be any available media that is accessible by computer system/server 102, and it includes both volatile and non-volatile media, removable and non-removable media.

System memory 160 can include computer system readable media in the form of volatile memory, such as random-access memory (RAM) 162 and/or cache memory 164. Computer system/server 102 may further include other removable/non-removable, volatile/non-volatile computer system storage media. By way of example only, storage system 165 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces. As will be further depicted and described below, memory 160 may include at least one program product having a set (e.g., at least one) of program modules that are configured to carry out the functions of embodiments of the disclosure.

Program/utility 168, having a set (at least one) of program modules 169, may be stored in memory 160 by way of example, and not limitation, as well as an operating system, one or more application programs, other program modules, and program data. Each of the operating system, one or more application programs, other program modules, and program data or some combination thereof, may include an implementation of a networking environment. Program modules 169 generally carry out the functions and/or methodologies of embodiments of the invention as described herein.

Computer system/server 102 may also communicate with one or more external devices 140 such as a keyboard, a pointing device, a display 130, etc.; one or more devices that enable a user to interact with computer system/server 102; and/or any devices (e.g., network card, modem, etc.) that enable computer system/server 102 to communicate with one or more other computing devices. Such communication can occur via Input/Output (I/O) interfaces 120. Still yet, computer system/server 102 can communicate with one or more networks such as a local area network (LAN), a general wide area network (WAN), and/or a public network (e.g., the Internet) via network adapter 150. As depicted, network adapter 150 communicates with the other components of computer system/server 102 via bus 115. It should be understood that although not shown, other hardware and/or software components could be used in conjunction with computer system/server 102. Examples include, but are not limited to: microcode, device drivers, redundant processing units, external disk drive arrays, RAID systems, tape drives, and data archival storage systems, etc.

Referring now to FIG. 2, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
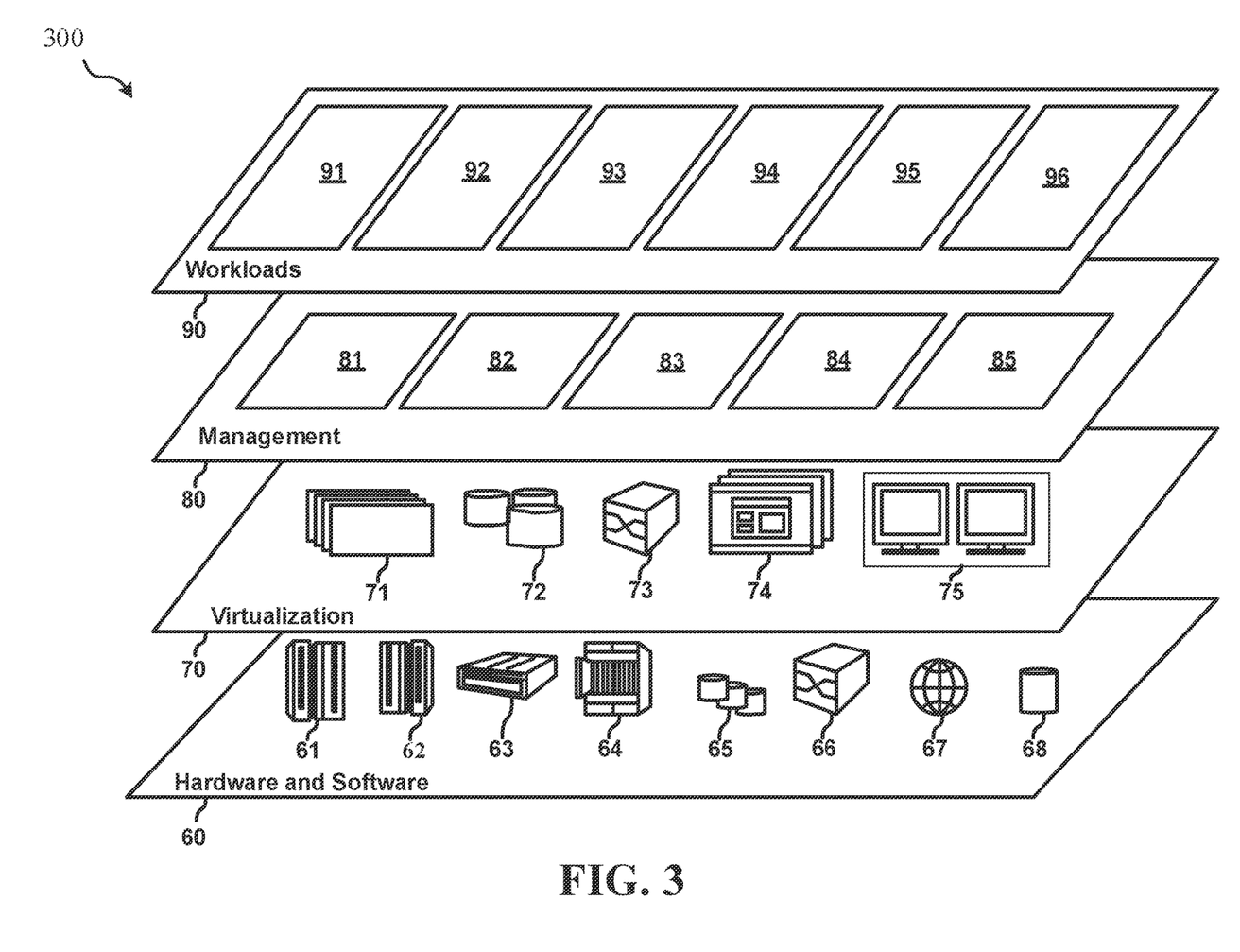
FIG. 3 depicts abstraction model layers according to some embodiments of the present disclosure.

Referring now to FIG. 3, a set of functional abstraction layers 900 provided by cloud computing environment 50 (FIG. 2) is shown, according to some embodiments. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data reorganizing 96.

As discussed herein, it is a big challenge to get insight information from unstructured original data from, for example, social media, emails, business processes, logs of computing environments, IoT devices etc. For instance, for logs, currently, there may be a large number of logs that belong to different applications and with different formats. Engineers sometimes need to expend significant effort to read logs, and it is not easy to catch any key information.

Embodiments in the present disclosure can provide methods, systems and program products to address this problem.

Figure 4:
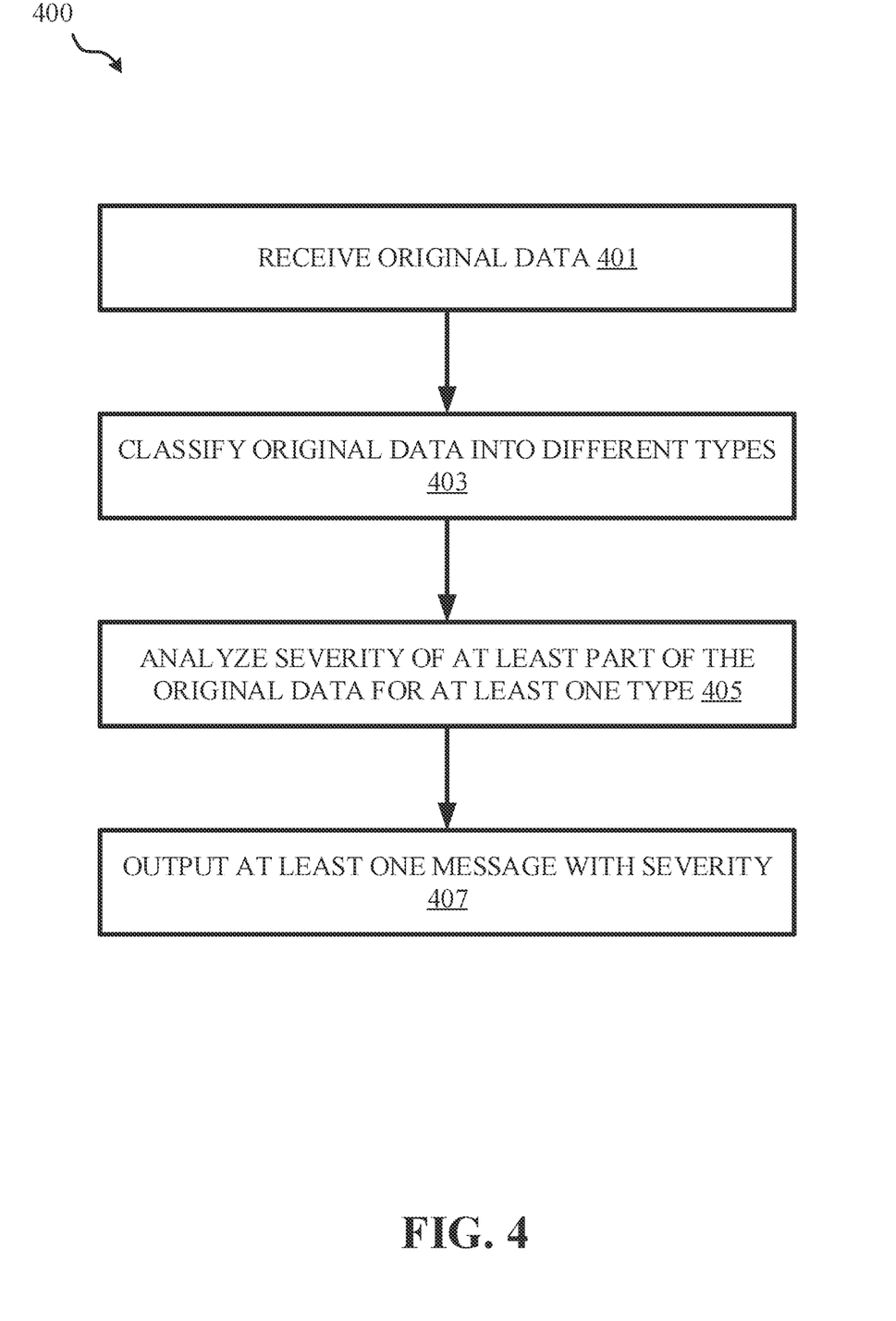
FIG. 4 depicts an example flowchart of a method for reorganizing the original data according to some embodiments of the present disclosure.
Figure 5:
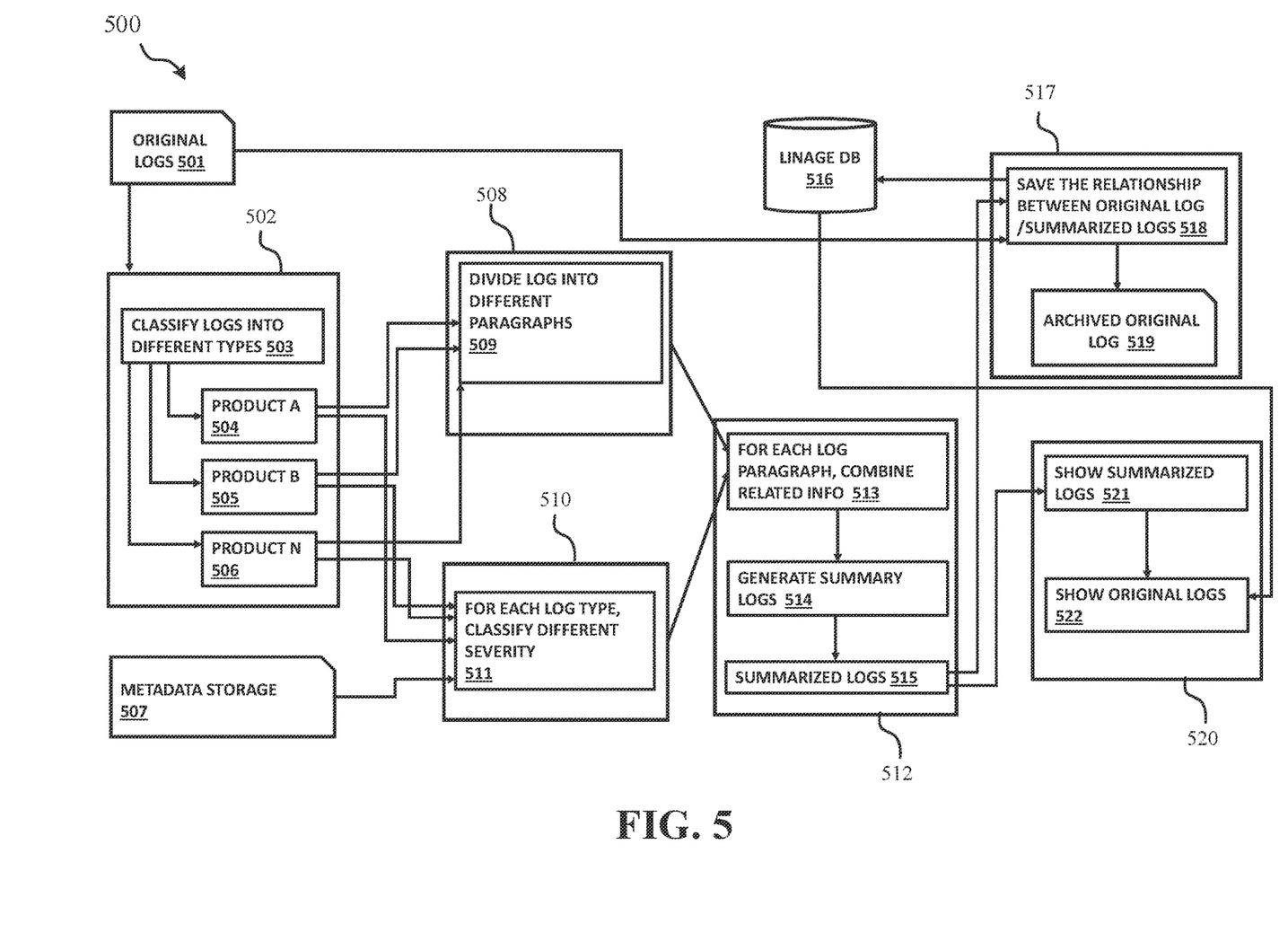
FIG. 5 depicts an example diagram for a data reorganization system according to some embodiments of the present disclosure.

FIG. 4 depicts an example flowchart of an example method 400 for reorganizing original data according to some embodiments in the present disclosure. The example method can be implemented, such as by an example reorganization system 500 as shown in FIG. 5, which will be further described later in the detailed description.

At block 401, the method 400 includes a step of receiving original data by one or more processing units. In some embodiments, the original data may be related to at least one data source selected from the group consisting of: social media, emails, business processes, logs of computing environments, and IoT devices. According to some embodiments, the original data is logs of a computing environment.

At block 403, the method 400 includes a step of classifying the original data into different types based on a trained type classification model. In some embodiments, the trained type classification model may be implemented by a type classification module later described.

At block 405, the method 400 includes a step of analyzing the severity of at least part of the original data based on a trained severity classification model, where at least part of the original data may correspond to at least one type. In some embodiments, the analyzing may include generating at least one severity for the at least part of the original data. In some embodiments, the trained severity classification model may be selected from transformer models or BERT models. In some embodiments, the trained severity classification model may be implemented by a severity classification module later described. Details of how to train the type classification type model and the severity classification model will be further described later in the detailed description. In some embodiments, the type classifications may be applications from the same or different providers each with different log format. In the example of original data from social media, the type classifications may be data types of the different social media platforms. Those skilled in the arts may have the abilities to define the type classifications according to different data sources. In the following, embodiments will be described in connection with the logs of different applications as an example, however, it should not adversely limit the scope of the invention.

At block 407, the method 400 includes a step of outputting at least one message, the message indicating the severity of the at least part of the original data. In some embodiments, the at least one message may include the at least part of the original data, and at least one identification, at least one position, and the severity corresponding to the at least part of the original data. In some embodiments, the identification of the at least part of the original data may be an identification of a product.

In some embodiments, the method 400 may further include a step of dividing the at least part of the original data into different segments based on a trained division model, where the at least part of the original data may correspond to at least one type. In some embodiments, a segment may correspond to a job of an application. In the example of original data from social media, a segment may correspond to data from a certain user. Those skilled in the arts may have the abilities to define the segments according to different data sources. In some embodiments, the dividing the original data may include extracting the at least one identification and the at least one position from the at least one segment of the at least part of the original data. In some embodiments, the identification of the at least one segment of the at least part of the original data may be an identification of a job of the application, and the position may be the position of the log within the at least one segment of the at least part of the original data.

In some embodiments, the outputting the at least one message may include outputting an alarm message in real time responsive to the analyzed severity indicating an error. In this way, a severity indicating an error may not be ignored such that the problem of the system corresponding to the error may be solved in time.

In some embodiments, the method 400 may further include a step of summarizing the at least one segment, responsive to the determined severity indicates and error and the position is not an end of the at least one segment.

In some embodiments, the summarizing the at least one segment may be based on a trained summarization model, according to some embodiments, the trained summarization model may be an InfoSelection model.

Herein, some other embodiments may be described in connection with logs of a computing environment being the original data, however, it should be clear to those skilled in the art that the following description is merely for the purpose of an simplified illustration and will not adversely limit the scope of the disclosure. Those skilled in the art can leverage the present disclosure and apply to any proper kinds of original data related to social media, emails, business processes (e.g., E-commerce etc.), IoT devices, etc.

Now referring to FIG. 5, an example diagram of an example data reorganization system 500 is depicted, according to some embodiments. As shown in the overall architecture of the example data reorganization system 500 and the data flows, the original data 501 (such as logs of a computing environments as an example) may first pass through the type classification module 502 after being received. The type classification module 502 may be a transformer model or a BERT model, and can be trained with labeled history data from different applications as training data. The main task of the type classification module 502, in the case of logs of computing environments, is to classify a large number of logs into logs of different applications (503). Classifying the logs into logs of different applications may include extracting and obtaining the logs of different applications, such as the logs of product A 504 (log A), logs of product B 505 (log B) . . . and logs of product N 506 (log N).

Figure 6A:
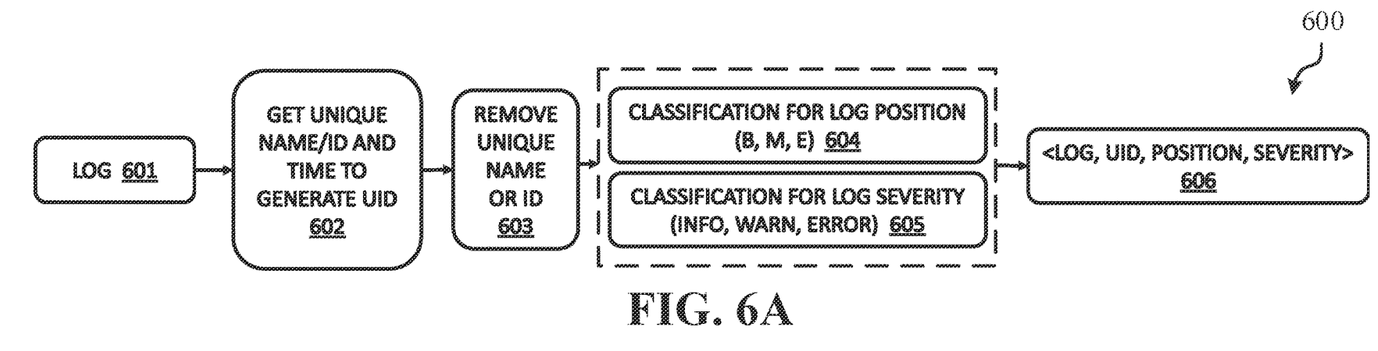
FIG. 6A depicts an example workflow for a division module and a classification severity module according to some embodiments of the present disclosure.
Figure 6B:
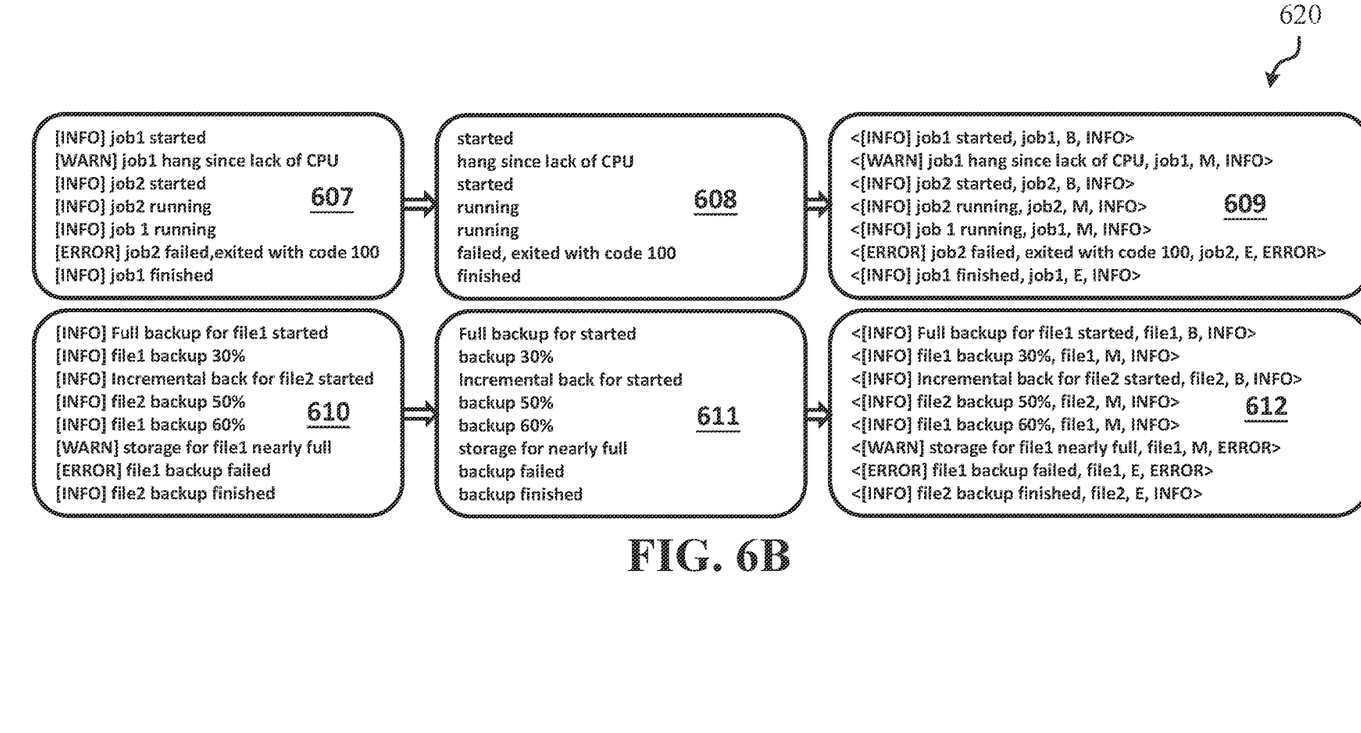
FIG. 6B depicts an example diagram for a division module and a classification severity module according to some embodiments of the present disclosure.

Then, the logs of each product (the log A, log B or log N) may enter two modules in parallel, one is division module 508, and the other is severity classification module 510. The division model 508 may be configured to divide the logs into several segments, as discussed above (in the case of logs, a segment may also be called a paragraph) based on a semantics analysis (in some embodiments, the division model 508 may divide a log into different paragraphs in each log type in 509). For example, in the case of virtual machine backup logs, the division may be based on different virtual machines. For example, a backup process of virtual machine 1 may be divided into paragraph 1, a backup process of virtual machine 2 into paragraph 2, etc. The severity classification module 510 may be configured to classify the importance of each item in each log (511). The severity classification module 510 may be trained by labeled historical data as training data (which may be stored in metadata storage 507). For instance, logs may be labeled by which logs are most important for diagnosing problems and which are less important. The output of the severity classification module 510 may be different levels of severities occurred in the log. The division module 508 and the severity classification module 510 will be further described by referring to FIG. 6.

The outputs of the division module 508 and the severity classification module 510 may then enter a summarization module 512, which may generate a standardized summary for the divided segments. In some embodiments, the summarization module 512 may combine related info in each log paragraph in 513, and generate summary logs in 514, and then summarize logs in 515 (in the case of logs, a segment may also be called a paragraph), such that the logs may be unified with the standardized form. Then the output of the summarization module 512 may enter a display module 520. The display module 520 is a visual display based on the different levels of severities occurred the log. Such visual display may include folded original logs in the format corresponding a timestamp, a severity information, and other possible information of an original log in a highlighted color (521, 522). In addition, an archive module 517 with a linage DB 516 may be configured to archive the folded original logs to save space. In some embodiments, the archive module 517 may save the relationship between original logs and summarize logs in 518 and obtain the archived original logs in 519. The summarization module 512 and the display module 520 will be further described by referring to FIG. 7.

The processing of data reorganization discussed above according to embodiments in the disclosure may be implemented by computer system/server 12 of FIG. 1, and the processing of data reorganization discussed above according to embodiments in the disclosure could be implemented on any cloud computing platform.

Now referring to FIGS. 6A and 6B, which depicts a set of example diagrams for how the division module 508 and the severity classification module 510 may work together according to one or more embodiments in the present disclosure. FIG. 6A shows a workflow (600) of the division module 508 and the severity classification model 510. The input of this process is a log 601 (here, a log 601 refers to logs of a certain type, classified, for example, by the type classification module 502, however only shown as one log for simplicity) and the output is a quadruple 606, where the log 601 itself may be the first item in the quadruple 606. FIG. 6B gives an example 620. In example 620, a log of product A is shown as 607, and a log of product B is shown as 610 as the input. In step 602, a unique identification (UID) (or a name) may be the second item in the quadruple may be extracted, where the UID may specify the identification of a log. For instance, for log analysis software, the UID may be the name of a job of the application. Then the UID may be removed from the logs in step 603 as shown in 608 and 611, and then a two-dimension classification (severity and segment) may be carried out in 604 and 605 according to some embodiments, for example, as discussed in the above, and then the quadruple 606 may be outputted. A message may be generated based on the quadruple 606 for log 601. According to some embodiments, the quadruple 606 itself may be the message.

In order to extract a UID (or a name), any existing keyword extraction methods, such as context-free grammars (CFGs) or Probabilistic Context-Free Grammars (PCFGs)

based on NLP syntax analysis, lexical analysis (based on Bi-LSTM-CRF algorithm system) or building a keyword vocabulary and/or keyword pattern matching library may be leveraged. Those skilled in the art may leverage any existing or future developed keyword extract tools to implement the extracting of the invention.

In block 604, the division module 508 may determine the position of the log in a segment, as discussed in the above, a segment may correspond to a job in an application. The position may be three categories: the beginning (B), the middle (M), and the end (E) where the beginning may be a position of the first sentence of the log for a certain job, such as job 1 being started to execute; the middle may be a position of a middle sentence of the log for the job, such as job 1 being executed for about 30%, or job1 being executed for about 50%; the end may be a position of the last sentence of the log for the job, such as job1 ended with a success, or ended with a failure. It should be understood that the position classification of identifying the beginning, the middle and the end is merely one example to better understand the embodiments in the disclosure; those skilled in the art may utilize any proper position depending on the real needs. The position may be the third item of the quadruple. The position may be determined with any existing text classification models, such as transformer models, BERT models, etc., the division module 508 may be trained by labeled history data as training data.

In block 605, the severity classification module 510 may output a severity classification, where the severity may be associated a log, a segment, or a type. Such severity classification may include for example: info, warning, error, where the classification of info indicates a normal log, the classification of warning indicates a log that may indicate error(s), and the classification of error indicates an error log. It should be understood that the severity classifications of info, warning, error are mere an embodiment to better understand embodiments in the disclosure, those skilled in the art may utilize use any existing. This is the fourth item of the quadruple 606. The severity classification module 510 can also be achieved with existing text classification models, such as transformer models, BERT models etc., and the severity classification module 510 also can be trained by labeled history logs as training data.

A corresponding quadruple may be generated for each log, which includes items in the order discussed above as <log, UID, position, severity>, however, the order is merely for the purpose of illustration, any other order may be used. Then these quadruples <log, UID, position, severity> 606 may be outputted to the summarization module 512. Block 609, 612 show the respective quadruples for original logs 607, 610 according to one or more embodiments of the invention. For the quadruple with the severity classification as "error", an alarm message may be outputted in real time to alert the user. In such way, a severity indicating an error may not be ignored such that the problem of the system corresponding to the error may be solved in time.

Figure 7:
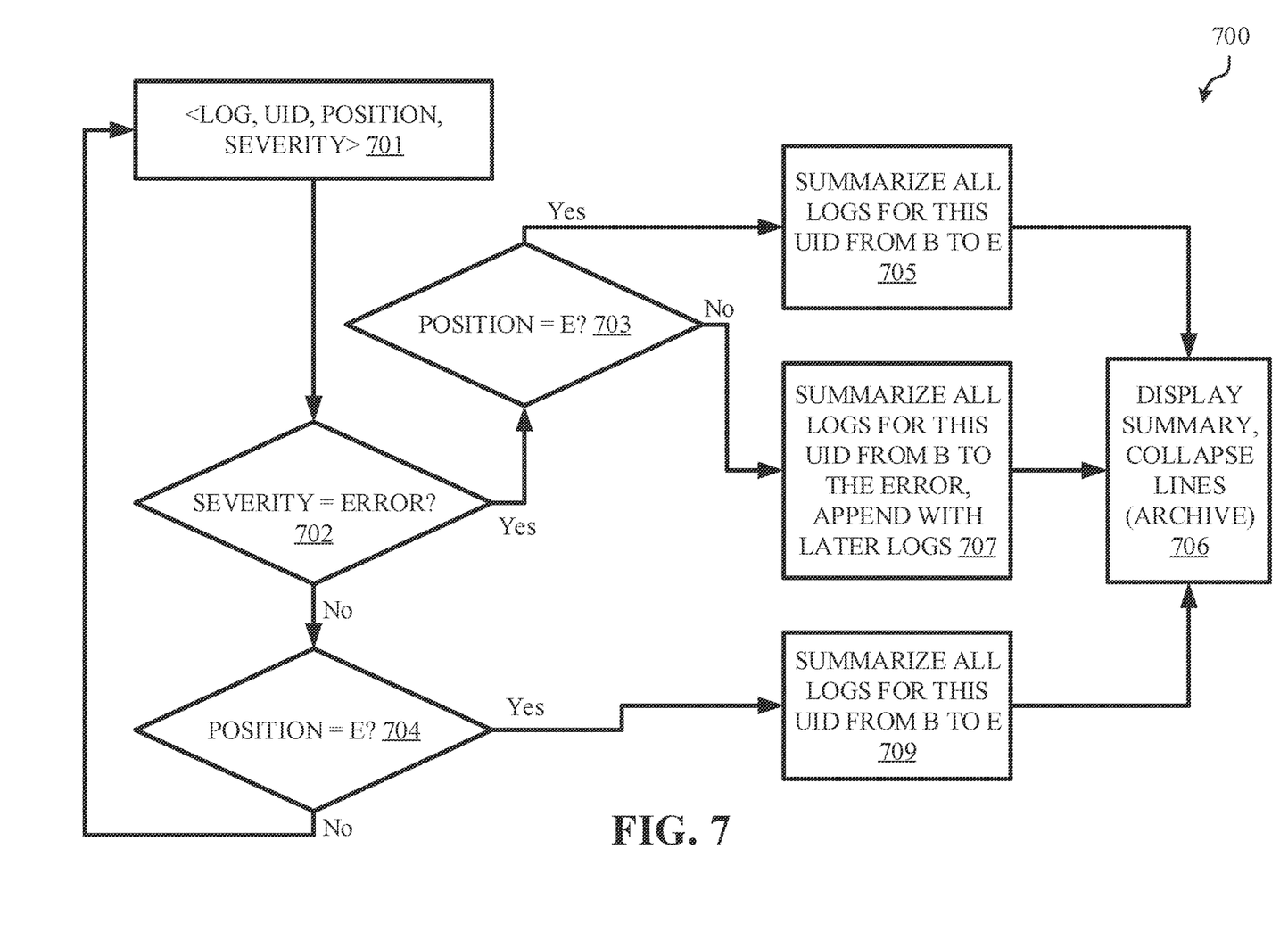
FIG. 7 depicts an example flowchart of a summarization module and a display module according to some embodiments of the present disclosure.

Now referring to FIG. 7, which depicts an example method 700 executed by the summarization module 512 and the display module 520 in some embodiments. The summarization module 512 may be a BERT model or a GPT model.

In operation 701 the quadruple information is obtained. Then, in 702, it is determined whether the severity classification indicates an error. If true, then the position may be determined in 703.

If, in operation 703, it is determined that the position is an end that indicates the end of a segment, a standardized summary for the log may be generated based on its UID from the beginning to the end of the segment by the summarization module 512 in 705. Then the generated summary may be outputted, for example, being highlighted in red color by the display module 520 in 706, those skilled in the art also can use any other proper method to highlight the log with a severity classification of an error.

If the position is not an end (in 703), a standardized summary for the log may be generated based on its UID from the beginning of the segment to the position by the summarization module 512 in 707. Then the generated summary may be outputted, for example, being highlighted in red color by the display module 520 in 706, and then supplement the log with the same UID in real time.

If it is determined in 702 that the severity classification (from 701) is not an error, method 700 proceeds to operation 704 to determine the position.

If, in operation 704, it is determined that the position is the end (i.e., the position is the end) which indicates the end of a segment, a standardized summary for the log may be generated based on its UID from the beginning to the end of the segment by the summarization module 512 in 709. Then the generated summary may be outputted, for example, being highlighted in green color by the display module 520 in 706, those skilled in the art also can use any other proper method to specify the log with severity as info, warn or error. If the position is not the end (in 704), method 700 may return to 701 to read the next quadruple in 701 until the last quadruple.

It should be pointed out that in the above embodiments of the present invention are described with logs of a computing environment, however, it is only for a better understanding of the present invention thus will not adversely limit the scope of the invention. For example, a person skilled in the art could leverage the algorithms, method and system of this invention to any original data, such as any proper kind of original data related to social media, email, business process (e.g., E-commerce etc.), IoT etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by one or more processing units, original data, wherein the original data comprises a log file;
classifying, by the one or more processing units, the original data into different type classifications based on a trained type classification model, wherein each different type is associated with a different application;
generating, by the one or more processing units, at least one severity classification for at least part of the original data based on a trained severity classification model, the at least part of the original data corresponding to at least one type from the type classifications, wherein the at least one severity classification indicates one or more levels of severity of the at least part of the original data;
determining, based on the at least the severity classification, the at least one part of the original data indicates an error; and
outputting, by the one or more processing units, at least one message, the at least one message indicating the severity classification of the at least part of the original data, wherein the severity classification indicates a problem associated with the error.

2. The method of claim 1, further comprising:
dividing, by the one or more processing units, the at least part of the original data into different segments based on a trained division model.

3. The method of claim 2, wherein the dividing comprises:
extracting, by the one or more processing units, at least one identification and at least one position for at least one segment of the at least part of the original data.

4. The method of claim 3, wherein the at least one message comprises:
the at least one identification, the at least one position, the at least one severity classification corresponding to the at least one segment.

5. The method of claim 4, wherein the original data are logs of a computing environment.

6. The method of claim 5, wherein:
the at least one identification identifies a job of the application; and
the position is the position of the log within the at least one segment.

7. The method of claim 2, wherein the trained division model and the trained severity classification model are selected from a group consisting of transformer models and BERT models.

8. The method of claim 4, further comprises:
responsive to a determination that the severity classification indicates an error and the position is not an end, summarizing, by the one or more processing units, the at least one segment.

9. The method of claim 8, wherein a resulting summary from the summarizing the at least one segment is displayed based on different levels of severities.

10. The method of claim 1, wherein the outputting comprises:
outputting, by the one or more processing units, an alarm message in real time indicating an error representing the severity classification.

11. The method of claim 1, wherein the original data is related to at least one data source comprising at least one of: social media, emails, business processes, logs of computing environments, and IoT devices.

12. A system having one or more computer processors, the system configured to:
receive original data, wherein the original data comprises a log file;
classify, by the one or more processing units, the original data into different type classifications based on a trained type classification model, wherein each different type is associated with a different application;
generate at least one severity classification for at least part of the original data based on a trained severity classification model, wherein the at least one severity classification indicates one or more levels of severity of the at least part of the original data;
determine, based on the at least the severity classification, the at least one part of the original data indicates an error; and
output at least one message, the at least one message indicating the severity classification of the at least part of the original data, wherein the severity classification indicates a problem associated with the error.

13. The system of claim 12, further configured to:
divide the at least part of the original data into different segments based on a trained division model.

14. The system of claim 13, wherein the dividing comprises:
extracting at least one identification and at least one position for at least one segment of the at least part of the original data.

15. The system of claim 14, wherein the at least one message comprises:
the at least one identification, the at least one position, and the at least one severity classification corresponding to the at least one segment.

16. The system of claim 15, wherein the original data are logs of a computing environment.

17. The system of claim 16, wherein:
the at least one identification is an identification of a job of the application; and
the position is the position of the log within the at least one segment.

18. The system of claim 13, wherein the trained division model and the trained severity classification model are selected from transformer models or BERT models.

19. The system of claim 12, wherein the original data is related to at least one data source comprising at least one of: social media, emails, business processes, logs of computing environments, IoT devices.

20. A computer program product comprising a computer readable storage medium having program instructions embodied therewith, the program instructions executable by a server to cause the server to perform a method, the method comprising:
receiving original data, wherein the original data comprises a log file;
classifying, by the one or more processing units, the original data into different type classifications based on a trained type classification model, wherein each different type is associated with a different application;
generating at least one severity classification for at least part of the original data based on a trained severity classification model, wherein the at least one severity classification indicates one or more levels of severity of the at least part of the original data;
determining, based on the at least the severity classification, the at least one part of the original data indicates an error; and
outputting at least one message, the at least one message indicating the severity classification of the at least part of the original data, wherein the severity classification indicates a problem associated with the error.

* * * * *